United States Patent [19]

Chu et al.

[11] 3,916,041

[45] Oct. 28, 1975

[54] METHOD OF DEPOSITING TITANIUM DIOXIDE FILMS BY CHEMICAL VAPOR DEPOSITION

[75] Inventors: Ting L. Chu, Dallas, Tex.; John R. Szedon, McKeesport; Joseph E. Johnson, Pittsburgh, both of Pa.

[73] Assignee: Westinghouse Electric Corporation, Pittsburgh, Pa.

[22] Filed: Feb. 14, 1974

[21] Appl. No.: 442,972

[52] U.S. Cl. .................... 427/253; 427/58; 427/79; 427/126
[51] Int. Cl.² ..................... C23C 11/08; B44D 1/18
[58] Field of Search ................. 117/106 R, 201, 221

[56] References Cited
UNITED STATES PATENTS

| | | | |
|---|---|---|---|
| 3,331,716 | 7/1967 | Bloem et al. | 117/201 |
| 3,506,556 | 4/1970 | Gillery et al. | 117/201 |
| 3,650,815 | 3/1972 | Ghoshtagore et al. | 117/106 R |
| 3,811,917 | 5/1974 | Diefendorf | 117/106 R |

*Primary Examiner*—Cameron K. Weiffenbach
*Assistant Examiner*—Ralph E. Varndell, Jr.
*Attorney, Agent, or Firm*—C. L. Menzemer

[57] ABSTRACT

A method is provided for depositing thin adherent films of high purity titanium dioxide on a substrate. A gaseous mixture of a titanium tetrahalide, hydrogen and oxygen containing a molar excess of hydrogen is passed over a heated substrate surface. The substrate is heated to a temperature between 227°C. and 927°C. and preferably below 600°C. to provide a reaction between the gaseous mixture which results in the formation of an adherent titanium dioxide on the surface of the substrate.

6 Claims, No Drawings

METHOD OF DEPOSITING TITANIUM DIOXIDE FILMS BY CHEMICAL VAPOR DEPOSITION

FIELD OF THE INVENTION

The present invention relates to dielectric films with high dielectric constants for use in solid state devices and particularly to titanium dioxide films.

BACKGROUND OF THE INVENTION

Titanium dioxide films have been useful in both active and passive solid state devices because of the dielectric properties. The dielectric constant in rutile form parallel to the C-axis can be as high as 170. Further the dielectric constant values are relatively insensitive to temperatures up to 300°C. and to frequencies into the gigacycle range.

Both physical and chemical vapor deposition techniques have been used for the preparation of titanium dioxide films. The physical methods include the evaporation deposition of titanium followed by oxidation, and the sputter deposition of titanium in an oxygen-rich atmosphere. See Holland, "Vacuum Deposition of Thin Films" (1956), p. 466. The chemical methods of deposition are, however, preferred because the physical deposition results in films with metal rich grains and causes damage to the substrate surface. Further, control of the stoichiometry and the film thickness are difficult by the physical methods.

Reported chemical methods include the pyrolysis of tetraisopropyl titanate and the hydrolysis of titanium tetrachloride, see Yokozawa, Iwasa and Tevamato, Jap. J. Appl. Phys. I., 96 (1968); and Fluersanger, Proc. I.E.E.E. 52, 1963 (1964). However, these reported methods for making titanium dioxide have not been found satisfactory. For example, titanium dioxide films prepared with organic esters are likely to be contaminated with organic materials. The hydrolysis of titanium tetrachloride is difficult to control because of the rapid reaction rate at room temperature and above. Further, the volume reaction on hydrolysis of titanium tetrachloride makes at least part of the film non-adherent.

Many of these problems have been overcome by the chemical method described in U.S. Pat. No. 3,650,815, granted Mar. 21, 1972 and assigned to the assignee of the present invention. That is, titanium dioxide films of rutile structure are prepared by reacting titanium tetrachloride and oxygen on a heated substrate in a temperature between 400° and 1,100°C. These films are extremely pure and can be closely controlled in thickness. Further, the films have substantially no porosity and are extremely useful in metal-insulated semiconductor devices.

However, the films prepared in accordance with U.S. Pat. No. 3,650,815 have an extremely high percentage of oxygen. There are a number of applications, e.g. memory cores, where oxygen deficient titanium dioxide is desirable because of the charge storage characteristic. Oxygen deficient titanium dioxide films can be prepared by hydrolysis of water vapor and titanium tetrachloride, see, e.g. Proc. IEEE (December 1964), pp. 1,463–1,465. This method, however, has the disadvantages of introducing impurities and contaminants into the oxide film and lacking control over constituent components therein.

The present invention overcomes these disadvantages of the prior art techniques. It provides a method of making high purity adherent titanium dioxide films containing rutile fibers, which are oxygen deficient.

SUMMARY OF THE INVENTION

A method is provided for depositing adherent thin films of titanium dioxide on a substrate. The substrate surface is prepared and heated to a temperature between 227°C and 927°C and preferably below 600°C. A gaseous mixture of a tetrahalide vapor, hydrogen gas and oxygen gas containing a molar excess of hydrogen is passed over the heated substrate surface. Gaseous mixture is thus caused to react and to form on the substrate surface an adherent titanium dioxide film.

Preferably the molar ratios of oxygen and titanium tetrahalide to hydrogen are less than 0.02 to 1.0. More specifically, the gaseous constituents preferably pass over the heated surface at flow rates such that the oxygen, hydrogen and titanium tetrahalide flow at rates correspond to $1.6 \times 10^{-2}$, 1.0 and $4.2 \times 10^{-4}$ mole/minute, respectively. Further, it is preferred that the gaseous mixture includes a carrier gas, preferably argon, neon, krypton or helium, to carry the tetrahalide vapor into the reaction chamber and over the heated substrate surface.

Other details, objects and advantages of the invention will become apparent as the following description of the presently preferred embodiments thereof and the presently preferred methods for practicing the same proceeds.

DESCRIPTION OF THE PREFERRED EMBODIMENTS

Titanium dioxide films are formed on a substrate surface by the reaction of titanium tetrachloride, hydrogen and oxygen in accordance with the following chemical equation:

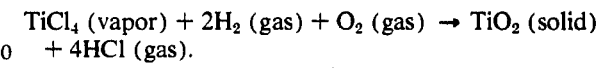

$$\text{TiCl}_4 \text{ (vapor)} + 2\text{H}_2 \text{ (gas)} + \text{O}_2 \text{ (gas)} \rightarrow \text{TiO}_2 \text{ (solid)} + 4\text{HCl (gas)}.$$

To provide high purity gaseous reacting components, the titanium tetrachloride is preferably prepared by multiple distillation. Also, commercially available high purity hydrogen and high purity oxygen are utilized.

The distilled titanium tetrachloride is preferably placed in standard bubbler apparatus where it is maintained at a predetermined constant temperature, e.g. 25°C. Preferably, a sufficient volume of carrier gas such as an inert gas selected from the group consisting of argon, neon, krypton and helium, or a gaseous mixture of inert gas and oxygen, is directed through the bubler containing the titanium tetrachloride to carry titanium tetrachloride vapor into the reaction chamber at reduced partial pressure. The oxygen and hydrogen gases are introduced into the reaction chamber with the titanium tetrachloride for the chemical reaction as described above.

The reactor chamber may be a quartz tube having gas inlet and outlet tubes and a susceptor for supporting the substrate. The susceptor may be silicide coated graphite. However, it is preferred that the susceptor be a quartz encapsulated graphite block, or a graphite block successively coated with silicon carbide and silicon dioxide to minimize contamination of the substrate by outgassing of the graphite and to minimize contamination or erosion of the susceptor by oxidation. The susceptor is positioned within the reaction tube and externally heated by an RF generator.

The substrate which is positioned on the susceptor may be made by any suitable material which is not adversely affected by oxidation at the deposition temperature. Materials such as silicon which do slightly oxidize in the process may be used because the slight oxidation of the surface does not adversely affect the adherence of the titanium oxide to the substrate. Such substrates are here defined as substantially non-oxidizable. Other suitable substrates include spinel, quartz and sapphire.

Preferably, however, single-crystal silicon substrates are used in which the major surface is preferably oriented in the [111] crystallographic plane. The silicon substrate, and particularly major surface for deposition, is then cleaned by any one of the well known cleaning techniques. For example, the silicon substrate and particularly the major surface may be cleaned by degreasing in acetone and tetrachloroethylene and thereafter boiling in sulfuric-nitric acid ($H_2SO_4$:$HNO_3$;3:1). Substrate may then be chelated using ammoniumethylenediaminetetracete, which is a complexing agent for removing metal ions from the semiconductor surfaces. After degreasing, boiling and chelating, the semiconductor body is rinsed extensively in Super-Q water, i.e. continuously recycled deionized water.

The substrate is heated in the reactor to a temperature of from about 227°C. to approximately 927°C. and, preferably, heated to below about 600°C. Temperatures below 227°C. provide negligible reaction rates and therefore are not preferred. At this temperature the gaseous mixture is caused to flow over and about the substrate to react and deposit an adherent titanium dioxide film.

In the operation of the invention, it is believed that a secondary reaction occurs prior to the principal reaction in the vicinity of the substrate. Specifically, it is believed that a small amount of water vapor is formed which causes hydrolysis of the titanium tetrahalide and the formation of the hydrohalic acid. Since the reactants, hydrogen and oxygen, form water slowly at the reaction temperatures and particularly below the preferred 600°C., the deposition reaction can be accurately controlled; whereas in prior art methods utilizing a water vapor, the reaction proceeds rapidly at room temperature. Furthermore, by maintaining the molar amount of oxygen substantially below that required for stoichiometric production of water, the possibility of an explosion is substantially reduced if not eliminated.

Thus, the molar amount of hydrogen is required to be greater than either the oxygen or titanium tetrachloride. However, in order to avoid partial reduction of the titanium dioxide by hydrogen at high temperatures, the gaseous composition must not contain a large excess of hydrogen. Therefore, oxygen or a mixture of oxygen and an inert gas is used as a carrier gas or diluent to avoid any large excess of hydrogen.

Therefore, the molar ratios of oxygen and titanium tetrachloride to hydrogen of less than 0.02 to 1 are preferred. For example, a flow rate of oxygen, hydrogen and titanium tetrachloride of $1.6 \times 10^{-2}$, 1.0 and $4.2 \times 10^{-4}$ moles per minute, respectively, has been found particularly suitable preferably where the substrate temperature about 600°C. and below. At such a flow rate and temperature, the deposition rate is approximately 50 A/min. The film of $TiO_2$, thus deposited, is tightly adherent and has rutile fiber structure with an average crystalline size of several microns. Moreover, the titanium dioxide film is oxygen deficient.

To illustrate the present invention, a number of Al-$TiO_2$-Si structures were prepared using a 500 A $TiO_2$ film deposited on N-type silicon substrates having resistivities of 25 ohm-cm.

The silicon substrates were first lapped cleaned and etched and positioned on a susceptor of solid graphite coated with fused silica in a quartz reaction tube. The susceptor was heated by an RF generator to maintain the silicon substrate at 600°C. A gaseous mixture of oxygen, hydrogen, titanium tetrachloride were passed over the substrate to react and form a tightly adherent film of titanium dioxide on the substrate surface. The flow rates of oxygen, hydrogen and titanium tetrachloride were $1.6 \times 10^{-2}$, 1.0 and $4.2 \times 10^{-4}$ mole/min., respectively. Electron diffraction examination of the formed films showed that the titanium dioxide had a rutile structure and was oxygen deficient.

Capacitance-voltage measurements of the film-substrate structures gave low flat-band voltage (ca. -0.8v). The dielectric constant of the material at 100 kHz was approximately 50, or about three times greater than that obtainable with tantala which is commonly used in film capacitors. No strong, slow dielectric polarization effects were found in the structures for a ± 5 v or less bias. At high biasing voltages, the films displayed considerable conductivity.

In general, it was concluded the electrical conductivity was similar to that found in single crystal rutile. The conduction appeared to be ohmic for voltages less than two volts. At a 1 v bias, the current density was about $1 \times 10^{-8}$ amp/cm$^2$. The current was found to increase substantially linearly with higher bias voltages. Moreover, it was found that after the passage of a charge (ca. 0.3 coul/m$^2$) through the film (capacitor), the higher conductivity regime permanently became about three orders of magnitude more conducting.

In the films deposited at 600°C., the C-axis was found to be strongly oriented perpendicular to the silicon substrate and showed effects of carrier injection from the metal. Suppression of the electronic effects was not possible with the 600°C films.

Similar films were then made at a 900°C deposition temperature. The deposits were preferentially oriented with the C-axis more parallel to the substrate surface. Further, the electronic effects were not dominate. These films lacked carrier injection effects and had only moderate ionic effects. In terms of ionic charge effects, the 900°C titanium dioxide film resembled thermally grown silicon dioxide. Moderate positive mobile charge densities (ca. $5 \times 10^{12}$ charges/cm$^2$) were made to drift at low temperatures. These films also had a high dielectric constant, ca. 100.

All of the films prepared in accordance with the method of the present invention were of high quality and suitable for use in solid-state devices, such as MOS transistors and memory cores.

While the preferred embodiments of the invention have been shown and described with particularity, it is distinctly understood that the invention may be otherwise variously embodied and utilized within the scope of the following claims. For example, while the description is in reference to titanium tetrachloride, and titanium tetrachloride is typically used, the invention may be performed with other tetrahalides of titanium.

What is claimed is:

1. A method for depositing a thin film of titanium dioxide on a substrate, comprising:
   a. heating a substantially non-oxidizable substrate surface to a temperature between 227°C. and 927°C.;
   b. passing a gaseous mixture of a titanium tetrahalide vapor, hydrogen gas and oxygen gas containing a molar excess of hydrogen over said substrate surface to react and form an adherent titanium dioxide film on said surface.

2. A method for depositing a thin film of titanium dioxide as claimed in claim 1 wherein:
   the substrate surface is heated to a temperature below 600°C.

3. A method for depositing a thin film of titanium dioxide as set forth in claim 1 wherein:
   the molar ratios of oxygen and titanium tetrahalide to hydrogen are less than 0.02 to 1.

4. A method for depositing a thin film of titanium dioxide as set forth in claim 3 wherein:
   the oxygen, hydrogen and titanium tetrahalide are passed over said surface at flow rates of $1.6 \times 10^{-2}$, 1.0 and $4.2 \times 10^{-4}$ mole/minute, respectively.

5. A method for depositing a thin film of titanium dioxide as set forth in claim 1 wherein:
   said gaseous mixture includes an inert carrier gas.

6. A method for depositing a thin film of titanium dioxide as set forth in claim 5 wherein:
   said inert carrier gas is selected from the group consisting of argon, neon, krypton and helium.

* * * * *